United States Patent
Zirnheld

[11] Patent Number: 5,254,968
[45] Date of Patent: Oct. 19, 1993

[54] ELECTRICALLY CONDUCTIVE PLASTIC SPEED CONTROL RESISTOR FOR AN AUTOMOTIVE BLOWER MOTOR

[75] Inventor: Richard A. Zirnheld, Lockport, N.Y.

[73] Assignee: General Motors Corporation, Detroit, Mich.

[21] Appl. No.: 898,278

[22] Filed: Jun. 15, 1992

[51] Int. Cl.⁵ .................................. H01C 13/00
[52] U.S. Cl. ............................. 338/50; 338/51; 338/195; 338/308; 219/510; 219/517
[58] Field of Search ............. 338/50, 51, 195, 308; 337/297, 197, 198, 401, 415; 219/510, 517

[56] References Cited

U.S. PATENT DOCUMENTS

| | | | |
|---|---|---|---|
| Re. 30,158 | 11/1979 | Bucklin et al. | 337/166 |
| 2,672,542 | 2/1952 | Fisher | 201/64 |
| 3,473,146 | 10/1969 | Mulligan | 338/293 |
| 3,821,602 | 6/1974 | Linkous | 317/13 B |
| 3,928,837 | 12/1975 | Esper et al. | 338/22 R |
| 4,017,728 | 4/1977 | Audesse et al. | 240/1.3 |
| 4,097,790 | 6/1978 | Wilson | 318/471 |
| 4,208,645 | 6/1980 | Harmon et al. | 337/297 |
| 4,306,213 | 12/1981 | Rose | 337/297 |
| 4,317,027 | 2/1982 | Middleman et al. | 219/553 |
| 4,342,020 | 7/1982 | Utner et al. | 338/314 |
| 4,352,083 | 9/1982 | Middleman et al. | 338/23 |
| 4,380,749 | 4/1983 | Eichelberger et al. | 338/215 |
| 4,408,244 | 10/1983 | Weible | 361/24 |
| 4,450,496 | 5/1984 | Doljack et al. | 361/58 |
| 5,000,662 | 3/1991 | Yamamoto et al. | 338/308 X |

*Primary Examiner*—Marvin M. Lateef
*Attorney, Agent, or Firm*—Mark A. Navarre

[57] ABSTRACT

A blower motor speed control resistor array in which the resistor elements contain an electrically conductive plastic material which melts to limit the blower motor current in the event of an extreme temperature condition. The conductive plastic is insert molded on a terminal array to form a self-supporting structure adapted to be disposed in an air duct. Each resistor of the array is defined by a number of legs of electrically conductive plastic extending between a pair of parallel headers, in the manner of a picket fence.

9 Claims, 3 Drawing Sheets

ELECTRICALLY CONDUCTIVE PLASTIC SPEED CONTROL RESISTOR FOR AN AUTOMOTIVE BLOWER MOTOR

This invention relates to an automotive blower motor speed control resistor apparatus formed in part of electrically conductive plastic.

BACKGROUND OF THE INVENTION

In automotive blower motor installations, several discrete blower speeds are customarily achieved through the use of various resistor elements connected in series with the blower motor via a multi-position speed control switch. In such installations, the resistor elements may be formed in an array on a support structure disposed in the inlet or discharge air path of the blower to dissipate heat generated by the passage of motor current through the resistor elements. The resistor elements may be discrete (wire-wound, for example) or printed in an array on a substrate in the manner of a printed circuit board.

The motor current path is protected by a fuse, and the conventional practice is to design the resistor element assembly to withstand worst case conditions for which the fuse may not provide adequate protection. These conditions include, for example, certain electrical short conditions, stalled blower motor and blocked blower air flow. Alternately, individual fuse or other thermal-responsive elements may be incorporated directly into the resistor array, or the resistor elements may be comprised of PTC materials which increase in resistivity with increasing temperature.

SUMMARY OF THE PRESENT INVENTION

The present invention is directed to an improved blower motor speed control resistor array in which the resistor elements are formed of an electrically conductive plastic material which melts to limit the blower motor current in the event of a condition of inadequate heat dissipation.

In the illustrated embodiment, the conductive plastic is insert molded on a terminal array to form a self-supporting structure adapted to be disposed in an air duct. Each resistor of the array is defined by a number of legs of electrically conductive plastic extending between a pair of substantially parallel headers which form the resistor terminals. In a preferred embodiment, the intermediate or inter-header portions of the resistor legs are aligned in alternate planes along the length of the respective headers to provide increased resistor surface area.

The entire self-supporting array is mounted in an air duct in proximity to the blower discharge area, such that the airflow passes around and between the legs of each resistor element to dissipate the resistive heat. In the event that a condition of inadequate heat dissipation causes an elevation of the array temperature beyond the melting point of the conductive plastic, one or more of the resistor legs melt, increasing the circuit resistance to limit the current supplied to the blower motor. The length and width dimensions of the legs may be tailored to provide the desired blower speeds, and the specific material composition may be selected to achieve a selected characteristic melting temperature.

DETAILED DESCRIPTION OF THE DRAWINGS

Figure 1:
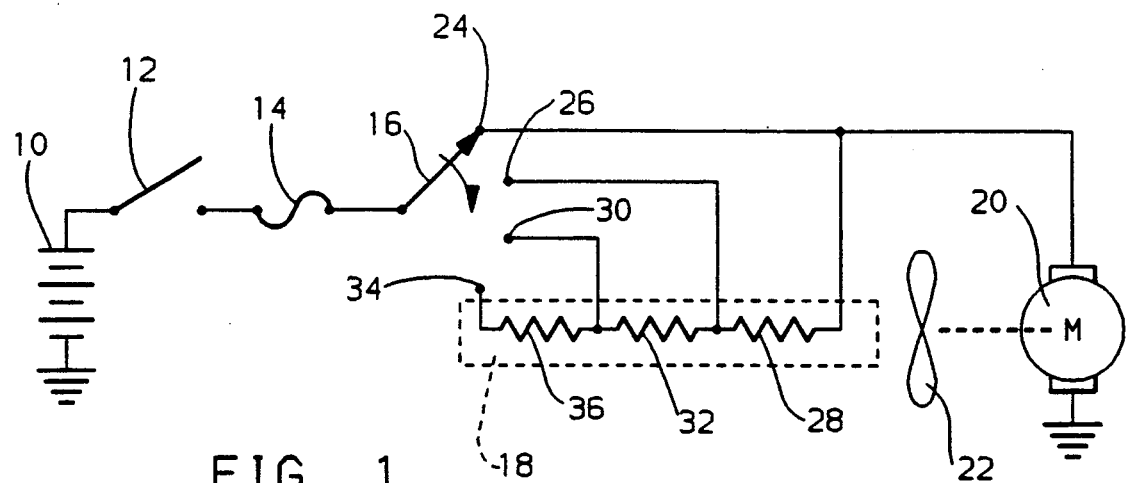
FIG. 1 is an schematic diagram of a conventional automotive blower motor control including a three resistor array for speed control of the blower motor.

FIG. 1 generally depicts a conventional vehicular blower motor control system including a storage battery 10, a key-operated ignition switch 12, a fuse 14, an operator manipulated fan speed selector switch 16, a resistor array 18, a DC fan motor 20 and a motor driven impeller 22. In the illustrated embodiment, the positive terminal of battery 10 is connected to supply current to fan motor 20 via ignition switch 12, fuse 14 and selector switch 16. Alternately, the selector switch may be connected in the low side of the circuit—that is, between motor 20 and the negative terminal of battery 10.

The selector switch 16 is positioned by the operator to control the speed of fan motor 20 by controlling the resistance of the motor current path. When the selector switch engages the contact 24, as depicted in FIG. 1, the battery voltage is directly applied to the fan motor 20 for full speed operation. When the contact 26 is engaged, the current path of fan motor 20 includes the resistor 28. When the contact 30 is engaged, the current path of fan motor 20 includes both resistors 28 and 32. When the contact 34 is engaged, the current path of fan motor 20 includes all three resistors 28, 32 and 36. As the series resistance in the motor current path increases, the current supplied to the motor 20, and hence its speed of rotation, decreases.

The resistor array 18 and impeller 22 are mounted in relation to an air duct assembly (not shown) so that the air flow produced by rotation of the impeller 22 dissipates the heat generated in the resistor array 18 due to the passage of motor current therethrough. In extreme overcurrent conditions, due to a shorted motor winding, for example, the fuse 14 will open circuit to protect various other system elements. In other conditions, the motor current, while large enough to damage resistor array 18, may be insufficient to open fuse 14. Such a condition occurs, for example, if the fan motor stalls or if the air duct becomes blocked. In either event, the airflow may be inadequate to dissipate the heat generated in the resistor array 18, and some other mechanism must be provided to protect against damage to the blower motor and the resistor environs.

The resistor array of this invention is electrically equivalent to the array 18 of FIG. 1, but inherently operates to protect against damage to the blower motor and resistor environs in a condition of inadequate cooling. Each resistor element is defined by a plurality of electrically conductive plastic legs extending between a pair of generally parallel headers which form the resistor terminals.

Figure 2:
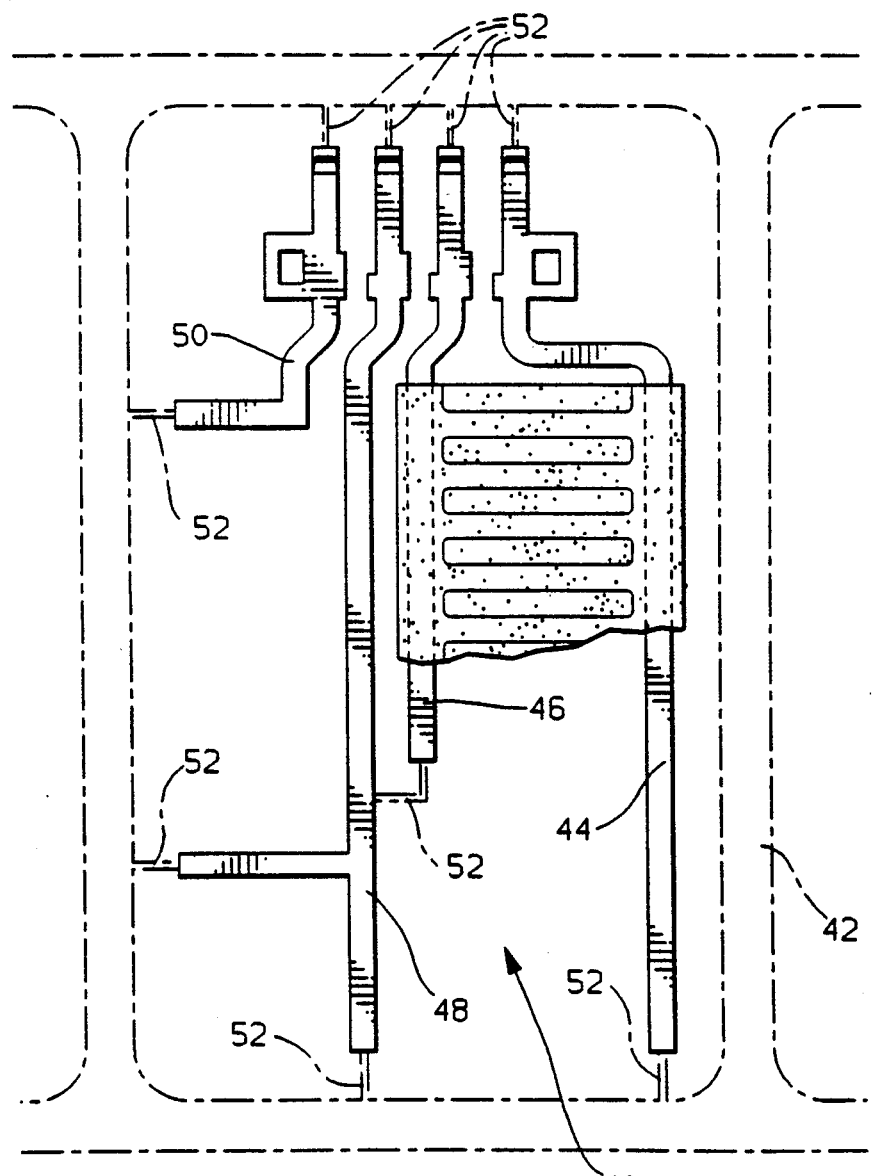
FIG. 2 depicts a partially completed resistor array and carrier assembly according to this invention.

According to this invention, the resistor elements are manufactured by an insert molding process in which conductive plastic material, such as 30% carbon fiber filled nylon, is molded about a metal terminal array. Referring to FIG. 2, the metal terminal array, designated generally by the reference numeral 40, is suspended in a metal carrier 42. The constituent terminal members 44-50 are each physically connected to the carrier 42 or an adjacent terminal member by at least two dispensable web elements 52.

Figure 3A:
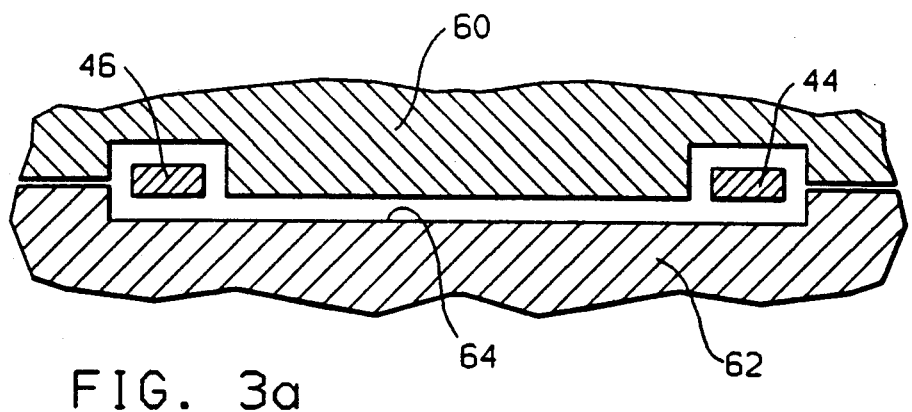
FIGS. 3a-3b depict sectional views of insert molding elements positioned in relation to the terminal array of FIG. 2.
Figure 3B:
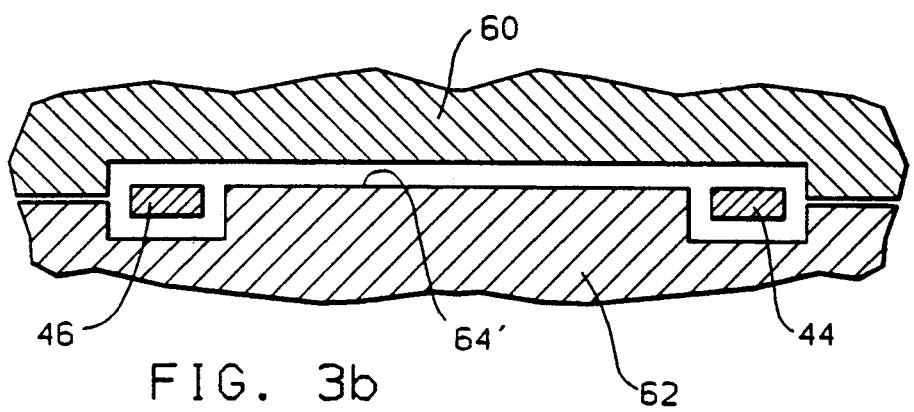

The carrier 42 is placed in an insert molding fixture between a pair of mold elements, as signified by the reference numerals 60 and 62, in the two axially displaced partial sectional views of FIGS. 3a and 3b. The interface of the mold elements 60-62 defines a number of cavities which surround and couple predetermined pairs of parallel extending terminal members. In the views of FIGS. 3a-3b, for example, the cavities 64 and 64' surround and couple the terminal members 44 and 46.

Ordinarily, it is difficult to achieve a low resistance interface between the metal terminal members and the electrically conductive plastic due to the insulating properties of the base polymer (nylon). However, we have found that an intimate, low resistance bond between the metal terminal members 44-50 and the electrically conductive plastic can be achieved by preheating the mold elements 60-62 and terminal members 44-50 to a temperature of approximately 150 degrees F. prior to filling the mold cavities 64, 64' with the electrically conductive material.

Once the cavities have been filled with the electrically conductive material, and the material has been allowed to cure at the preheat temperature, the mold elements 64, 64' are separated and the dispensable web elements 52 are severed. The result is a three element resistor array, as illustrated by the completed portion of FIG. 2. At this point, the resistor array is self-supporting and may be fitted with a suitable electrical connector (not shown) for connection with a selector switch 16, as described above in reference to FIG. 1. The array may then be mounted in an air duct assembly (not shown) in the vicinity of the air discharge outlet of impeller 22, parallel to the direction of airflow. The discharged air thereby flows around and through the openings between the various legs and headers of the array, providing a relatively large surface area through which generated heat may be dissipated.

Figure 4:
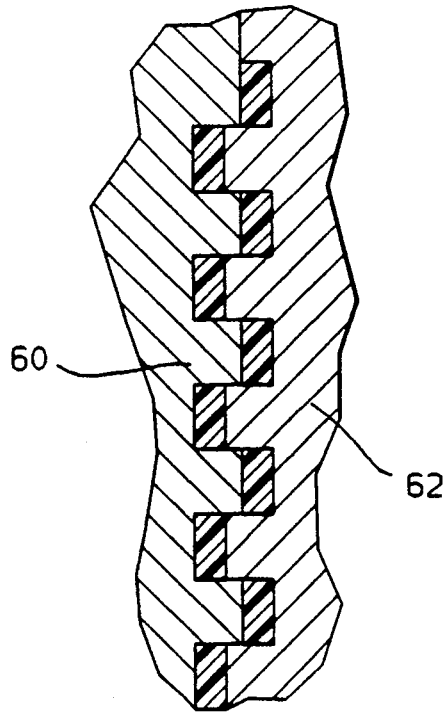
FIG. 4 depicts a sectional view of insert molding elements intermediate a pair of terminals in the array of FIG. 2.
Figure 5:
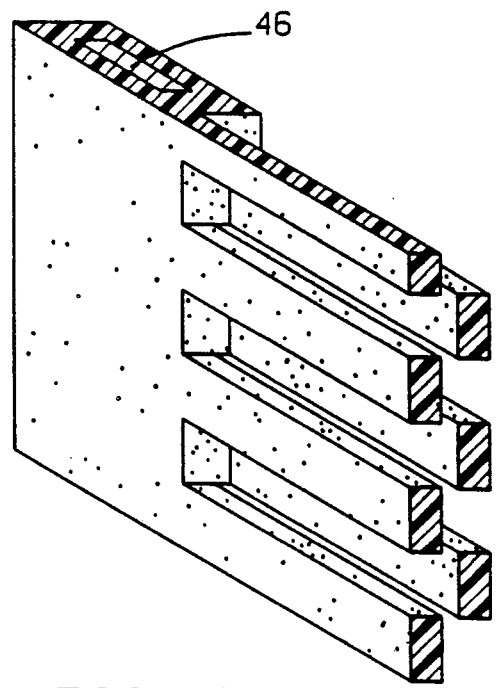
FIG. 5 depicts a partial perspective view of a completed resistor array according to a preferred embodiment of this invention.

In the illustrated embodiment, the mold elements 60-62 are configured such that the intermediate or inter-terminal portions of the parallel extending cavities 64 are aligned in alternate planes along the length of the respective terminal members. In the sectional view of FIG. 3a, for example, inter-terminal portion of cavity 64 is disposed in a plane coinciding with the lower faces of the terminal members 44-46 In FIG. 3b on the other hand, the inter-terminal portion of cavity 64' is disposed in a plane coinciding with the upper faces of the terminal members 44-46. This feature effectively doubles the surface area of electrically conductive plastic, as illustrated by the sectional view of FIG. 4, and the partial perspective view of FIG. 5.

Figure 6:
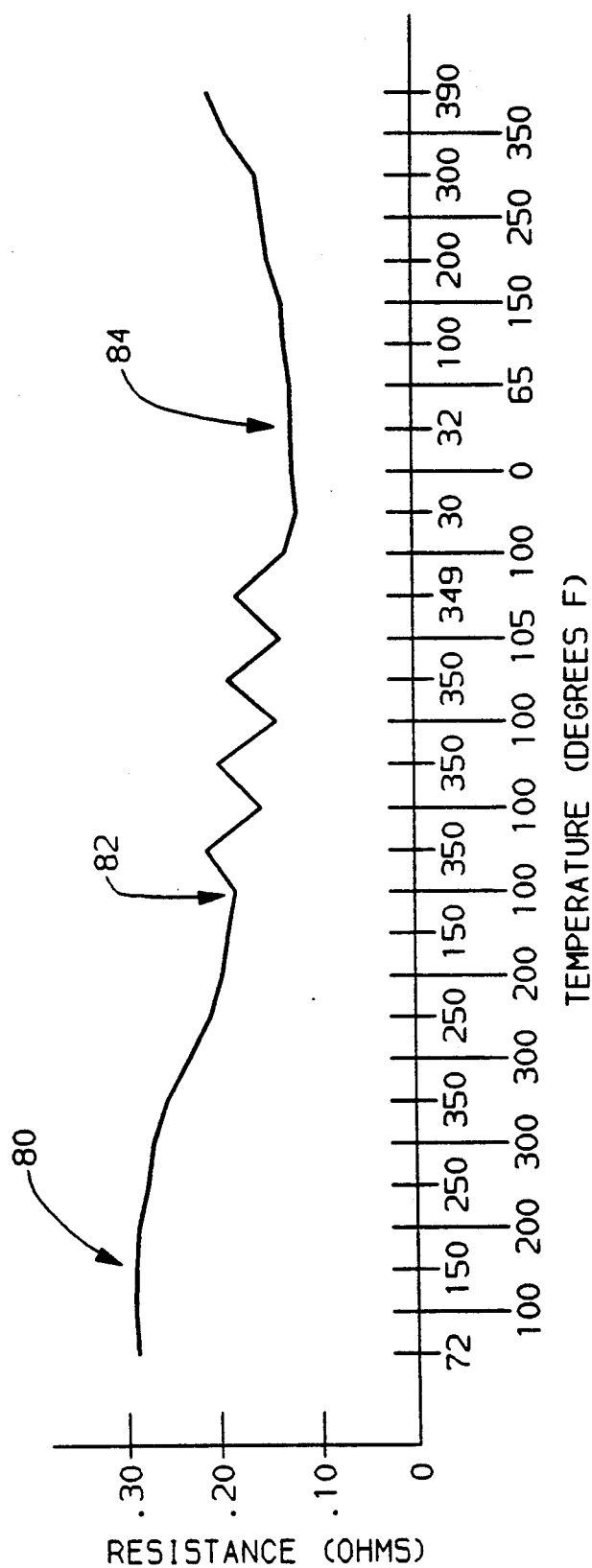
FIG. 6 graphically depicts the overall resistivity of a sample resistor element undergoing thermal cycling.

Once formed, the resistor array is subjected to a thermal cycling procedure in which the resistor elements are repeatedly heated to an annealing temperature (350 degrees F. for the designated material) as graphically depicted in FIG. 6. This serves to arrange the molecular structure of the electrically conductive material in its most stable state to achieve a consistent and predictable resistance vs. temperature characteristic.

FIG. 6 depicts the overall resistance of a resistor element according to this invention during the temperature cycling process. The resistor element has an initial resistance of approximately 0.272 ohms over a temperature range of 72-200 degrees F., as indicted by the reference numeral 80. After the first temperature cycle, the resistance of the element drops to approximately 0.175 ohms, as indicted by the reference numeral 82. After subsequent excursions to the annealing temperature of 350 degrees F., the resistance of the element stabilizes at approximately 0.125 ohms at 100 degrees F., linearly increasing to approximately 0.150 ohms at 300 degrees F., as indicated by the reference numeral 84. This final characteristic demonstrates the needed predictability and consistency over the usable temperature range of the material.

In the manner described above, the resistor array of this invention achieves the motor speed control function while providing inherent motor current limiting in the event of a condition of inadequate heat dissipation. In addition, the electrically conductive plastic resistor array of this invention has been shown to be smaller and more cost effective than a conventional resistor array, resulting in decreased air restriction and easier packaging in a duct assembly.

While this invention has been described in reference to the illustrated embodiment, various modifications will occur to those skilled in the art, and it should be understood that resistor arrays incorporating such modifications may fall within the scope of this invention, which is defined by the appended claims.

The embodiments of the invention in which an exclusive property or privilege is claimed are defined as follows:

1. In a vehicle blower motor control including a speed control resistor electrically connected in a current supply path of said blower motor and positioned in an air duct so that airflow produced by rotation of the blower motor dissipates heat generated in said resistor due to conduction of blower motor current therethrough, the improvement wherein the resistor is formed of electrically conductive plastic material having a characteristic melting temperature such that in a condition of inadequate heat dissipation, the resistor heats to said melting point whereupon portions of the electrically conductive plastic material melt to limit the current supplied to said motor and terminate the condition, said melting point being sufficiently low to protect the resistor environs from damage due to heating of the resistor.

2. The improvement set forth in claim 1, wherein the resistor comprises a series of conductive plastic leg elements extending between a pair of generally parallel terminals, the resistor being positioned in said air duct such that said airflow is directed around and between said leg elements, thereby to provide increased heat dissipation.

3. A speed control resistor for a vehicle blower motor control in which said resistor is electrically connected in a current supply path of said motor and disposed in an air duct so that airflow produced by rotation of the blower motor dissipates heat generated in said resistor due to conduction of blower motor current therethrough, said resistor comprising:

a plurality of conductive leg elements extending between a pair of substantially parallel metallic header elements connected in series with the motor current path, the leg elements being formed of an electrically conductive plastic material having a characteristic melting temperature such that in a condition of inadequate heat dissipation, the leg elements heat to said melting point whereupon said conductive plastic material melts to limit the current supplied to said motor and terminate the condition, said melting point being sufficiently low to protect the resistor environs from damage due to heating of the resistor.

4. The speed control resistor set forth in claim 3, wherein said resistor is formed by an insert molding process in which electrically conductive plastic material is molded about predefined portions of said metallic header elements, integral with the electrically conductive plastic material of said leg elements.

5. The speed control resistor set forth in claim 4, wherein said metallic header elements are preheated to a predetermined temperature prior to said molding of said electrically conductive plastic.

6. The speed control resistor set forth in claim 3, wherein said leg elements are aligned in alternate planes along a length dimension of said header elements.

7. In a vehicle blower motor control including a speed control resistor electrically connected in a current supply path of said blower motor and positioned in an air duct so that airflow produced by rotation of the blower motor dissipates heat generated in said resistor due to conduction of blower motor current therethrough, the improvement wherein the resistor is formed by an insert molding process in which electrically conductive plastic material is molded about and between a pair of substantially parallel extending metallic terminal elements, the electrically conductive plastic material having a characteristic melting temperature such that in a condition of inadequate heat dissipation, said material melts to limit the current supplied to said motor and terminate the condition, said melting point being sufficiently low to protect the resistor environs from damage due to heating of the resistor.

8. The improvement set forth in claim 7, wherein said metallic terminal elements are preheated to a predetermined temperature prior to said molding of said electrically conductive plastic material.

9. The improvement set forth in claim 7, wherein said resistor is repeatedly heated to a predefined annealing temperature to thereby impart a predictable and substantially consistent resistance vs. temperature characteristic to said resistor.

* * * * *